Sept. 24, 1963 A. CHAMPAGNAT 3,104,775

FLOATING COVERS FOR STORAGE TANKS

Filed March 2, 1961 6 Sheets-Sheet 1

INVENTOR
ALFRED CHAMPAGNAT
BY
Morgan, Finnegan, Durham & Pine
ATTORNEYS

INVENTOR
ALFRED CHAMPAGNAT
BY
Morgan, Finnegan, Durham & Pine
ATTORNEYS

INVENTOR
ALFRED CHAMPAGNET
BY
Morgan, Finnegan, Durham & Pine
ATTORNEYS

Sept. 24, 1963 A. CHAMPAGNAT 3,104,775

FLOATING COVERS FOR STORAGE TANKS

Filed March 2, 1961 6 Sheets-Sheet 4

INVENTOR
ALFRED CHAMPAGNAT
BY
Morgan, Finnegan, Durham & Pine
ATTORNEYS

INVENTOR
ALFRED CHAMPAGNAT
BY
Morgan, Finnegan, Durham & Pine
ATTORNEYS

INVENTOR
ALFRED CHAMPAGNAT
BY
Morgan, Finnegan, Durham & Pine
ATTORNEYS 3,104,775
Patented Sept. 24, 1963

3,104,775

FLOATING COVERS FOR STORAGE TANKS

Alfred Champagnat, Levallois (Seine), France, assignor of one-half to The British Petroleum Company Limited, London, England, a corporation of Great Britain Filed Mar. 2, 1961, Ser. No. 92,894
Claims priority, application France Mar. 7, 1960
12 Claims. (Cl. 220—26)

The present invention relates to a floating screen for tanks with a fixed roof and with a vertical axis, intended particularly for the storage of hydrocarbons and other volatile liquids.

A number of types of floating screens, or floating covers, have been proposed for use in storage tanks but whether these floating covers or screens are made of plastic material or metals, their cost is high, the volume taken by their parts when packed for transport is considerable, and their assembly inside the tank takes too long and frequently calls for the intervention of specialist fitters.

It is an object of the present invention to provide a floating screen of satisfactory character for the reduction of losses by evaporation of liquid contained in a storage tank and which can be manufactured at low cost.

According to this invention there is provided a screen for reducing losses by evaporation of liquid, contained in a storage vessel of which the wall or walls are upright, said screen comprising a framework, said framework consisting of a peripheral frame crossed by a plurality of parallel coplanar beams, the frame and beams consisting of or comprising a vertical web, said screen also comprising a horizontal sheet of material substantially or completely impervious to vapours of the liquid stored, the sheet lying over the framework and attached thereto, said screen also comprising floats, attached to the framework on the under side thereof and positioned to cause the screen, when in use, to float with said sheet above the level of the liquid and with the lower edges of the vertical webs of the circular frame and beams immersed in the liquid, whereby vapour over the liquid is trapped below the sheet in pockets formed between the peripheral frame and said beams.

According to a preferred variant of the invention, the framework supports a vertical skirt which is made either wholly or partly of plastic material or of elastomer and which is of sufficient rigidity to be self-supporting yet sufficiently flexible to be deformed if submitted to stresses resulting from being caught by unevennesses of said wall, and sufficiently elastic to resume its original form when it has passed the unevennesses. Preferably the upper part of this vertical skirt is rimmed on the outside with a flange made wholly or partly of plastic material or of elastomer, which rests lightly against the vertical wall of the tank.

In the case of tanks of large diameter, the parallel beams of the framework are reinforced by one or more cross-bracing girders at right angles to the beams. Preferably, these girders each have a vertical web which dips into the stored liquid.

It is also possible to fix feet, constituting support members, to the lower part of the framework. Preferably these are of sufficient length that, when the tank is empty, the framework rests on these feet leaving beneath it sufficient height necessary to permit of the work of cleaning the bottom of the tank.

The framework is preferably made of metal. The framework serves as a support for a light horizontal sheet which may be either completely or to a large degree impervious to the vapours of the liquid stored.

This sheet will be made of material substantially or completely impervious to the vapours of the liquid stored. This material may be light metal, plastic material or fabric coated with a suitable material, such as a plastic material. Preferably the sheet is made up of parallel strips. Preferably their width is slightly greater than the distance which separates two adjacent parallel beams of the framework. These strips may be made, for example of sheet metal or plastic material and may be fixed on to the framework by bolting, so that each unit overlaps the neighbouring unit. This overlapping is preferably reinforced against tearing by placing on top a long strip of flat or shaped cross-section made, for example, of light metal, which is bolted to the sheet metal units, and on top of these sheet metal units. The overlap can be made gas-tight by means of a suitable glue or adhesive and/or by interposing a sheet of cellular material.

According to another variant of the invention it is possible to use in place of the parallel strips a continuous pliable foil of plastic material or of fabric covered with a suitable material, having very large dimensions, which is introduced through the man hole rolled up after the fashion of a cigar, and is then unrolled on to the flat metal framework and is fixed on top by any suitable means. By this means therefore it is possible to cover the whole of the framework either with one unit or with a number of units of flexible thin foil introduced rolled up through the man hole of the tank.

The floats which are suitable for use in the apparatus of the invention are preferably sufficiently rigid and of a suitable width to serve as cross braces between the parallel beams of the framework.

According to a preferred embodiment of the invention, there are employed, hollow floats of light metal, e.g. aluminium or aluminium alloy manufactured by blowing according to the process known under the name of "Roll-bond."

The dimensions and distribution of the floats will be arranged in such a way that the sheet covering the framework does not touch the free surface of the liquid, so that a vapour phase is present underneath the screen and is partially imprisoned under this screen. This vapour phase is divided by the vertical webs of the sections of the framework which dip in the liquid; this arrangement contributes to the reduction in the evaporation by localising any leaks by which vapour could transfer from the imprisoned space below the sheet to the relatively free space above the sheet. Experience has shown that although absolute imperviousness is seldom achieved in practice the efficacy of the screen from the point of view of the reduction of losses by evaporation is not substantially impaired by this fact.

The vertical peripheral skirt which is fixed around the framework has the purpose of preventing the jamming of the screen during the rise and fall movements of the level of the liquid in the tank. Furthermore, it maintains a gaseous ring saturated with vapours of the stored liquid in contact with this liquid on the annular surface of liquid not covered by the screen, which has the effect of reducing the losses by evaporation on this surface. According to a preferred variant of the invention, the vertical skirt takes the form of an inverted letter L, and it is made of a flexible and elastic plastic material, or of an elastomer which may or may not be loaded. Choice is preferably given to a poly-ester resin loaded with a little glass fibre.

Another type of vertical skirt can be, in cross-section in the form of the letter Z.

It is also possible to employ a vertical skirt made of a thin metal section in the form of an inverted L. In this case, the upper metal flange is surmounted or lined by a part made of plastic material or pliable and elastic elastomer which comes into contact with the vertical wall of the tank.

Preferably, the whole of the floating screen, and especially its metal parts, are connected electrically to the mass of the tank by means of a flexible conductor wire, so as to prevent the accumulation of static electricity.

The floating screen, like all analogous devices, is preferably equipped with the usual accessories necessary for practical operation. For example:

(*a*) an orifice and vertical cable to prevent the rotation of the cover,
(*b*) an orifice and devices for gauging and sampling,
(*c*) a trapdoor to permit of the passage of the gases resulting from the entry of air during the pumping of liquids.

The invention is illustrated but not limited with reference to the accompanying FIGURES 1–13.

A floating screen having a top sheet of plastic foil or of coated fabric would have the same type of metal frame and for this reason will not form the subject of a special description.

Figure 1:
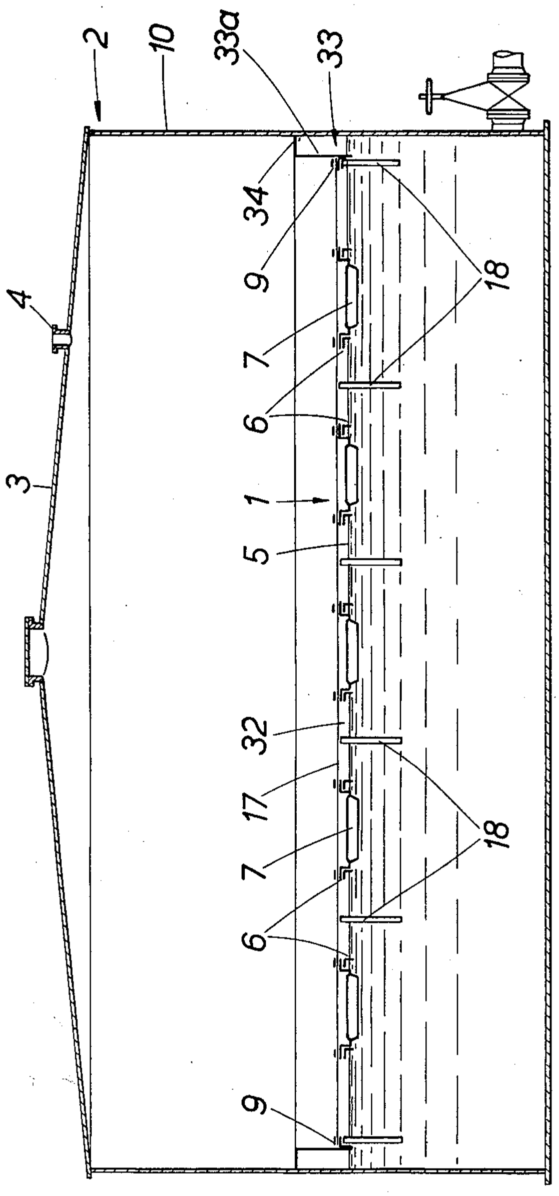
FIGURE 1 represents a tank in which a floating screen according to the invention has been installed.
Figures 2, 3:
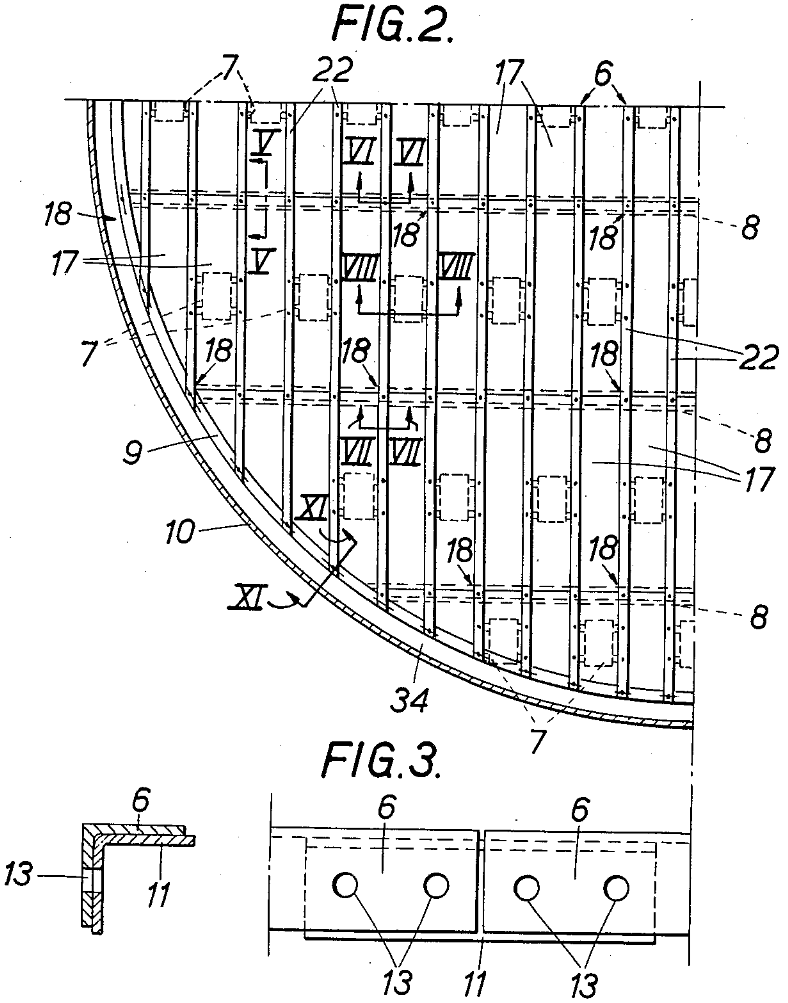
FIGURE 2 is a plan view of one quarter of the floating screen.
FIGURES 3 and 4 represent the end-to-end assembly of two longitudinal beams of two transverse girders.
Figure 4:
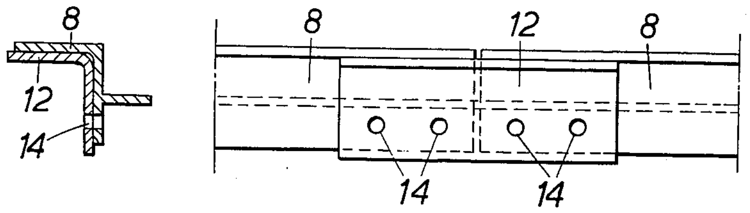

The floating screen 1 is installed in a tank 2 with a fixed roof 3, provided with a breathing aperture 4. The level of the liquid is at 5. The screen is made up of a framework of parallel beams 6, these frames being cross-braced by floats 7. In the case of tanks having a large diameter, girders 8, very widely spaced and shown in broken lines on FIGURE 2, are arranged perpendicularly to the beams 6. A circular curved frame 9 surrounds the framework of beams 6 at a small distance from the vertical wall 10 of the tank 2. The beams 6 and the girders 8 are assembled end-to-end by short frame units 11 and 12, with bolts passing into the holes 13 and 14 (FIGURES 3 and 4). The circular frame 9, which is introduced in units, is assembled in the same way.

Figure 6:
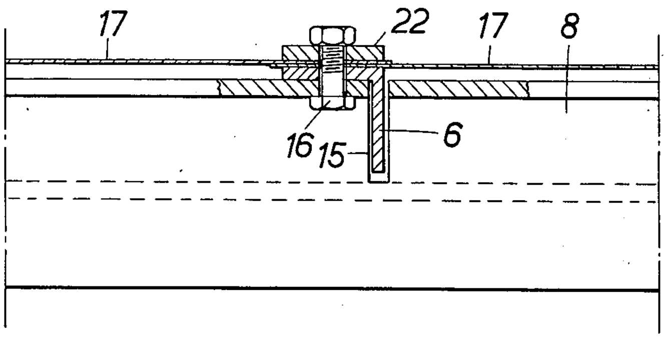
FIGURE 6 is a cross section along VI—VI of FIGURE 2.
Figures 10, 13:
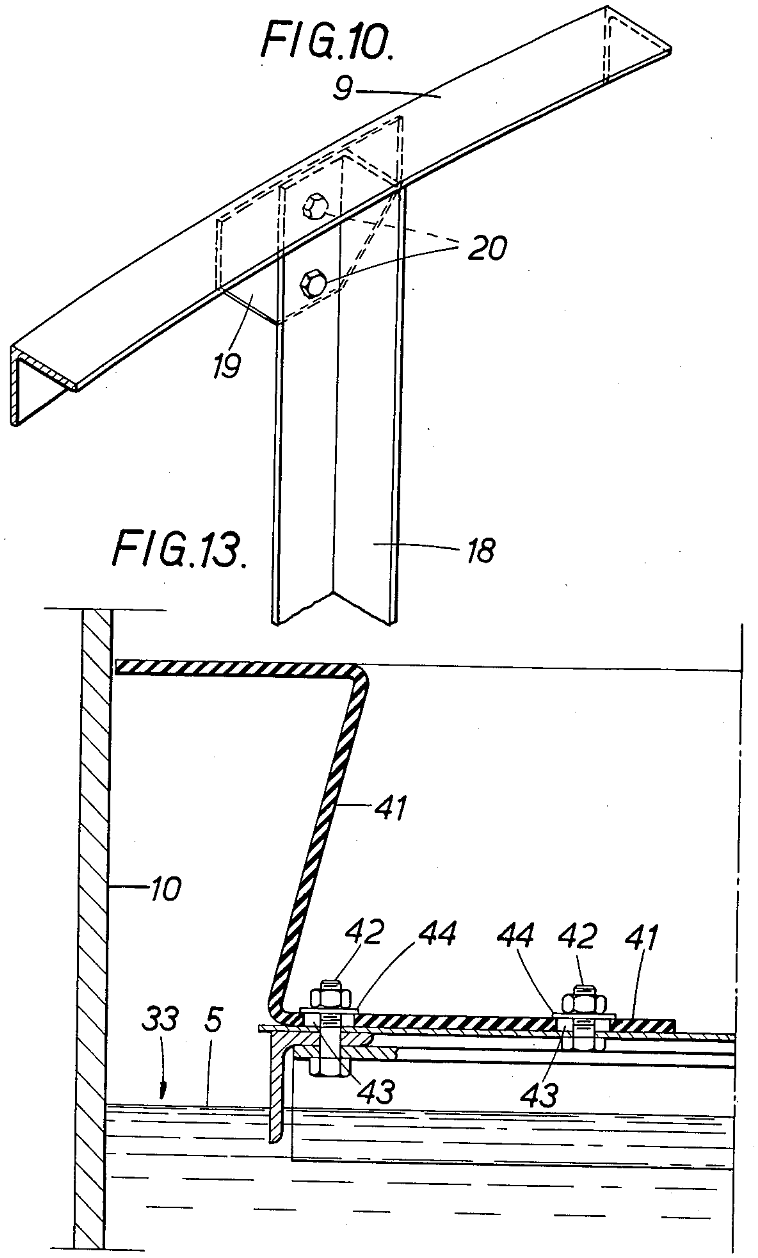
FIGURE 10 is a perspective view of a foot of the floating screen.
FIGURE 13 is a cross-sectional view of another form of the vertical skirt.

FIGURE 6 shows the assembly of beams 6 with girders 8, the said assembly being effected by means of bolts 16. Feet 18 (FIGURE 10) are fixed underneath the circular frame 9 (and under the girders 8) at widely spaced intervals (see FIGURE 2). They are made up of frames assembled perpendicularly underneath the frames 9 (or under the girders 8) by means of gussets 19 and bolts 20.

These feet support the floating screen when the tank is emptied.

Figure 7:
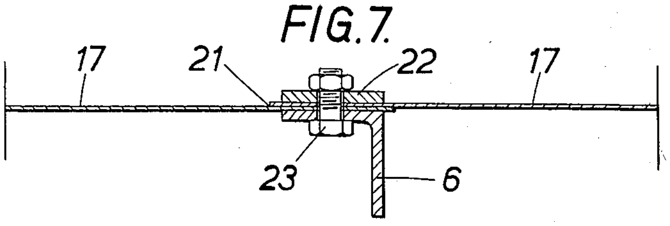
FIGURE 7 is a cross section along VII—VII of FIGURE 2.

The metal framework described above is covered with thin metal sheets 17, of great length, and having a width so that they rest on two adjacent beams 6 overlapping one another at 21 (FIGURE 7). A metal strip 22, which plays the part of a welt, is fixed over this overlap and the whole is fastened by the bolts 23 on the beam 6. It is also possible to use as the welt a strip having a U-shaped cross-section or having any other suitable cross-section.

Figure 5:
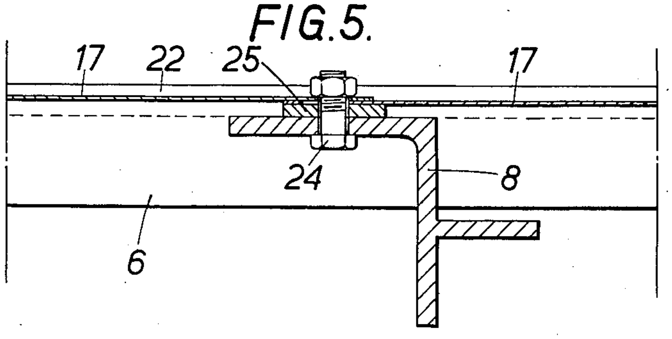
FIGURE 5 is a cross section along V—V in FIGURE 2.
Figures 11, 12:
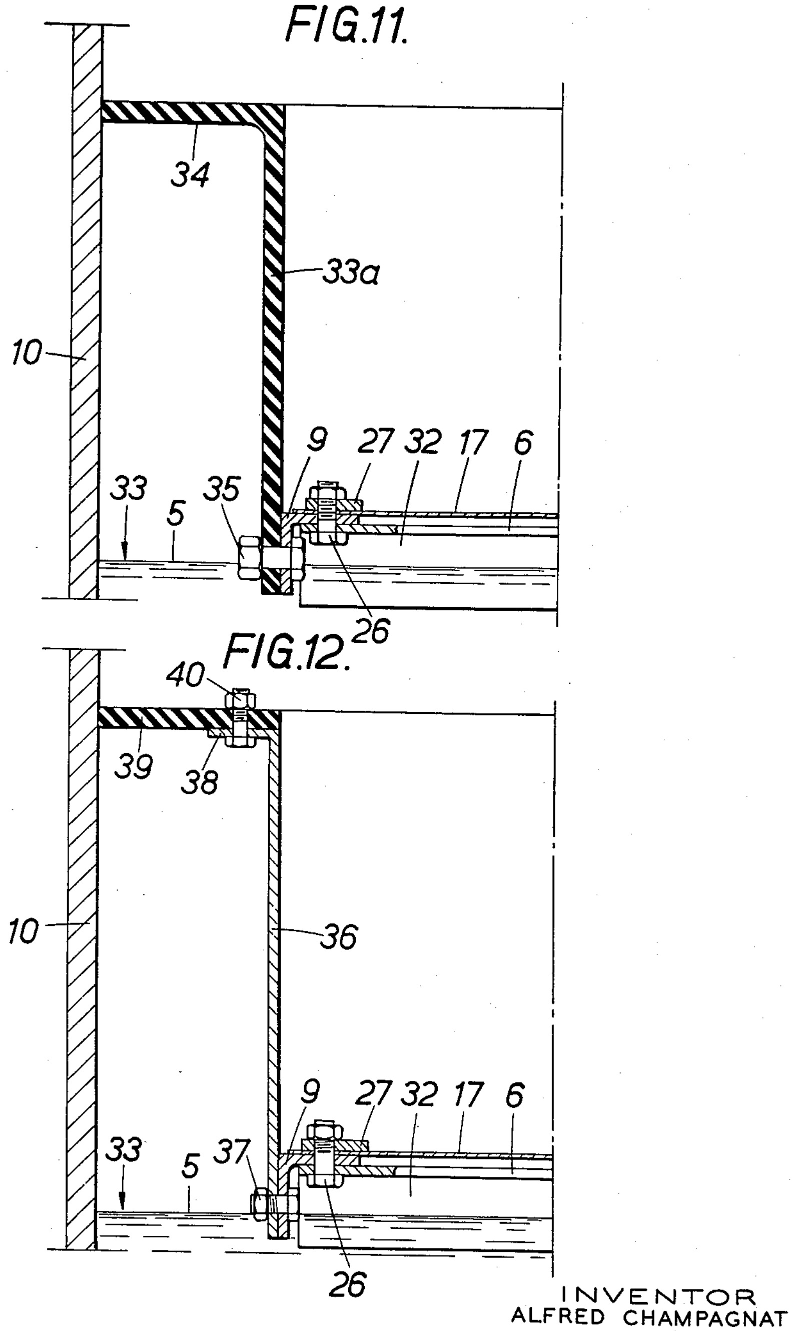
FIGURE 11 is a cross-sectional view of the vertical skirt along the line XI—XI of FIGURE 2.
FIGURE 12 is a cross-sectional view of a variant form of the vertical skirt.

The metal sheets 17 are assembled along their length by overlapping on the girders 8, by means of the bolts 24 (FIGURE 5), a metal strip 25 of the same thickness as the horizontal part of the beams 6, making it possible to arrange them horizontally. These metal sheets 17 are also fixed by the bolts 26 between the circular frame 9 and a welt 27 (FIGURES 11 and 12).

Figure 8:
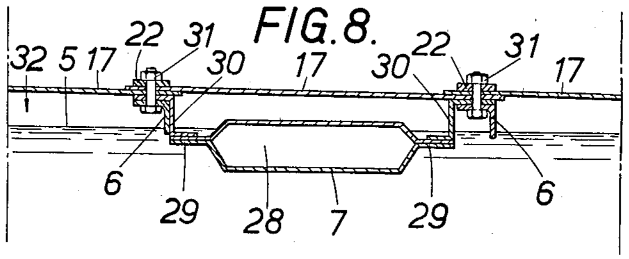
FIGURE 8 is a cross section of a float along the line VIII—VIII of FIGURE 2.
Figure 9:
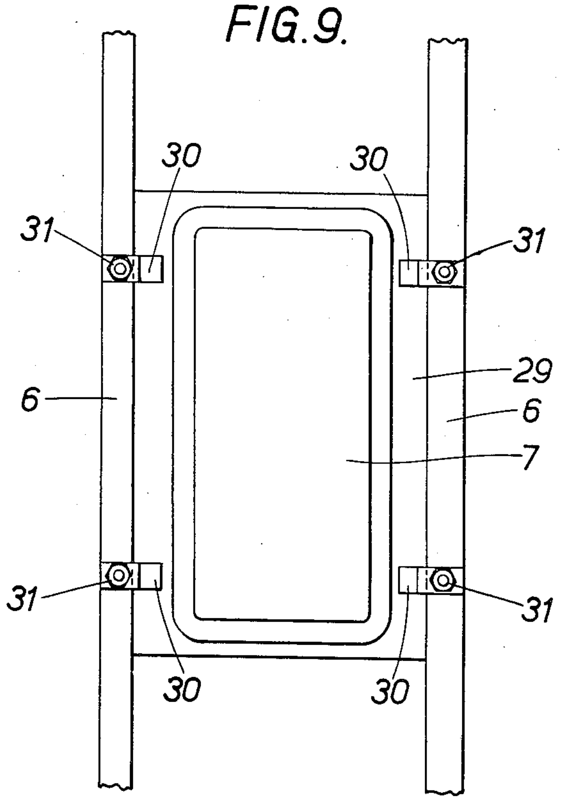
FIGURE 9 is a plan view of a float, the sheet of the screen having been removed.

The floats 7 (FIGURES 8 and 9) are preferably manufactured by the Roll bond process, by blowing two aluminium foils previously welded one on the other along their periphery by hot rolling, the central part having been protected against welding by a special ink. In this way one obtains a sealed hollow cavity 28 surrounded by flat edges 29. Welded lugs 30 make it possible to fix the floats 7 on to the parallel beams 6 by means of the bolts 31. These floats constitute cross braces for the parallel beams 6.

The floats are of such a capacity and are distributed in such a way that the screen floats on the liquid at level 5, with a vapour phase 32 imprisoned under the metal sheets 17 and enclosed around its periphery by the circular frame 9. This vapour phase is divided by the vertical webs of the sections of the framework which dip into the liquid.

The free surface of liquid 33 is isolated from the atmosphere by a vertical skirt **33*a* (FIGURE 11) made of flexible and elastic plastic material, preferably of a polyester resin slightly loaded with glass fibre. This vertical skirt comprises a horizontal flange 34 which rests against the vertical wall 10 of the tank. It is fixed to the vertical web of the circular frame 9 by bolts 35**.

A variant form of vertical skirt (FIGURE 12) consists of thin sheet metal 36 bolted at 37 on to the frame 9, and which carried a short horizontal flange 38. A horizontal flange 39 made of flexible and elastic plastic material or of elastomer is fixed by the bolts 40 on to the metal skirt.

Another variant of the vertical skirt 41 (FIGURE 13) having a cross-section in the form of a letter Z is made of a plastic or an elastomer. This comprises a horizontal base 41 which is fixed by bolts 42 to the sheets 17. This type of vertical skirt can be accurately adjusted to maintain contact with the wall of the tank despite irregularities of the surface of this wall. This is achieved by the provision of suitable holes in the horizontal section 41 of the skirt and preferably by the provision of slot 44 for the bolts 42 which have washers 43.

The floating screen also comprises the necessary accessories not shown in the drawing:

(*a*) the earthing of the tank by means of a cable which acts as a conductor of electricity,
(*b*) vertical cables to prevent rotation and orifices for for these cables to pass through,
(*c*) gauging and sampling orifices for the passage of the air accidently pumped in with the liquid,
(*e*) devices for draining away liquids condensed on the floating screen.

What we claim is:

1. A screen for reducing losses by evaporation of liquid, contained in a closed top storage vessel of which the wall or walls are upright, said screen comprising a metal framework, said framework comprising a peripheral frame, a plurality of spaced parallel coplanar beams attached at the end portions thereof to said peripheral frame, said peripheral frame and each of said beams comprising a vertical web, said screen also comprising a sheet of material impervious to vapors of the liquid stored, said impervious sheet completely covering said frame and said beams and being attached thereto at spaced points throughout said frame and beams, floats, said floats being attached to said frame and beams at the bottom edge thereof at spaced points throughout said framework, said floats being positioned to cause the screen, when in use, to float with said sheet above the level of the liquid and with the lower edges of the vertical webs of the frame and beams and a portion of the floats immersed in the liquid whereby vapor over the liquid is trapped below the impervious sheet in pockets formed between the peripheral frame and said beams.

2. A screen as specified in claim 1 in which the beams having a vertical web have a cross-section in the form of an inverted letter L.

3. A screen as specified in claim 1 in which the framework comprises a cross-brace girder set at right angles to the parallel beams and attached thereto at the points of intersection.

4. A screen as specified in claim 3 in which the framework comprises a plurality of parallel cross-brace girders each comprising a vertical web of which the lower edge, when the screen is in use, is immersed in the liquid, whereby vapour over the liquid is trapped in pockets delimited in part by said vertical web.

5. A screen as specified in claim 4 in which each cross-brace girder has a cross-section in the form of an inverted letter L.

6. A screen as specified in claim 1, each float consisting of a pair of sheets of material substantially impervious to vapours of the liquid stored, said sheets being bonded together at their peripheries, each float being attached to two adjacent beams of the framework.

7. A screen as specified in claim 1 having support members fixed to the lower part of the framework adapted to maintain the framework and floats clear of the floor of the tank, when the tank is empty.

8. A screen as specified in claim 1 in which the horizontal sheet which lies over the framework is made of thin metal.

9. A screen as specified in claim 1 in which the horizontal sheet which lies over the framework is made of thin plastic or elastomer material.

10. A screen as specified in claim 1 in which the horizontal sheet which lies over the framework is made of thin plastic coated or elastomer coated material.

11. A screen as specified in claim 1 in which the horizontal sheet which lies over the framework is made up of parallel strips of sheet material.

12. A screen as specified in claim 1 in which the framework is rimmed by a vertical skirt, being in cross-section in the form of an inverted letter L, said apron being made at least in part of a plastic material, the skirt being of sufficient rigidity to be self-supporting yet sufficiently flexible to be deformed if submitted to stresses resulting from being caught by unevennesses of said wall, and sufficiently elastic to resume its original form when it has passed the unevennesses.

References Cited in the file of this patent

UNITED STATES PATENTS

| | | |
|---|---|---|
| 1,700,887 | Glass | Feb. 5, 1929 |
| 2,023,308 | Cantacuzene | Dec. 3, 1935 |
| 2,281,748 | Carney | May 5, 1942 |
| 2,464,803 | Goldsby et al. | Mar. 22, 1949 |
| 2,867,346 | Champagnat | Jan. 6, 1959 |

FOREIGN PATENTS

| | | |
|---|---|---|
| 815,105 | Great Britain | June 17, 1959 |
| 1,116,442 | France | Feb. 6, 1956 |